(No Model.) 4 Sheets—Sheet 1.
J. T. ARMSTRONG.
ELECTRIC BATTERY AND MEANS FOR EMPTYING AND RECHARGING IT WITH THE EXCITING FLUID.
No. 340,474. Patented Apr. 20, 1886.
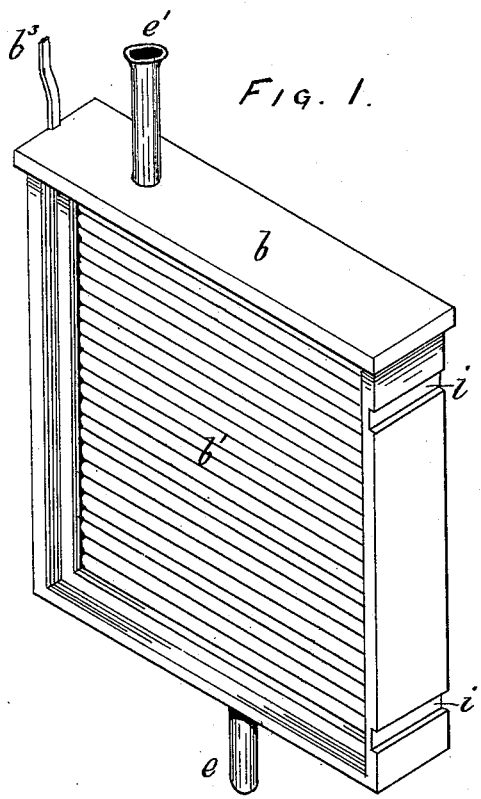
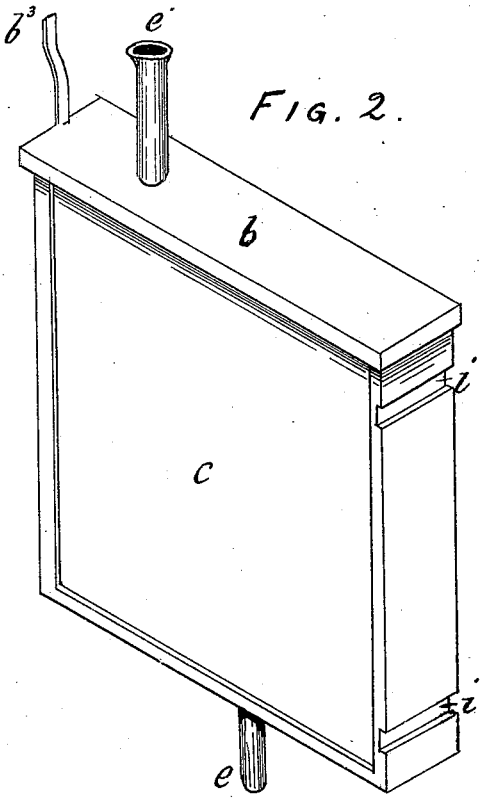
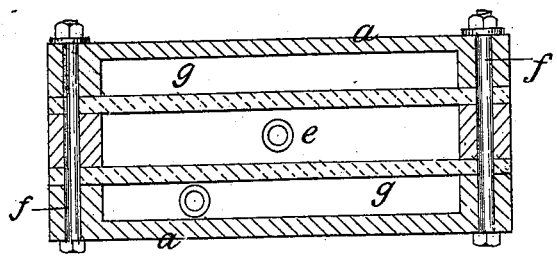
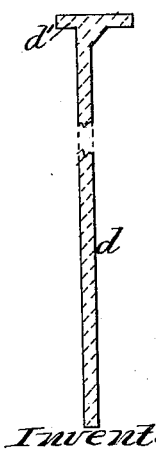
Witnesses
J. A. Rutherford
Robert Emmett
Inventor
James T. Armstrong
By James L. Norris
Atty.

(No Model.) 4 Sheets—Sheet 2.
J. T. ARMSTRONG.
ELECTRIC BATTERY AND MEANS FOR EMPTYING AND RECHARGING IT WITH THE EXCITING FLUID.
No. 340,474. Patented Apr. 20, 1886.
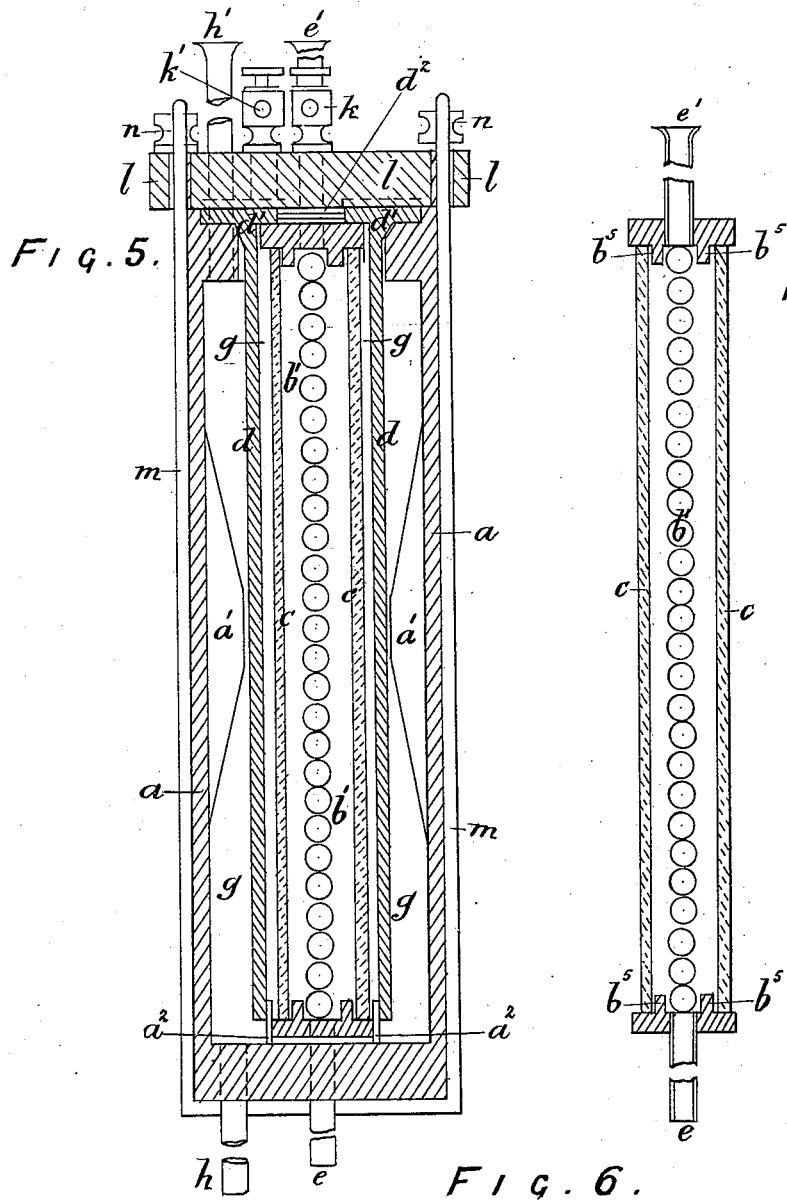
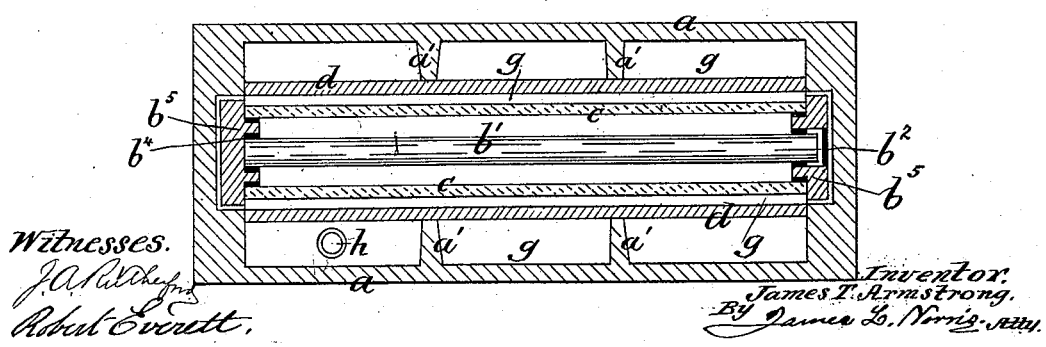
Witnesses. Inventor.
James T. Armstrong.
By James L. Norris, atty.

(No Model.) 4 Sheets—Sheet 3.
J. T. ARMSTRONG.
ELECTRIC BATTERY AND MEANS FOR EMPTYING AND RECHARGING IT WITH THE EXCITING FLUID.
No. 340,474. Patented Apr. 20, 1886.
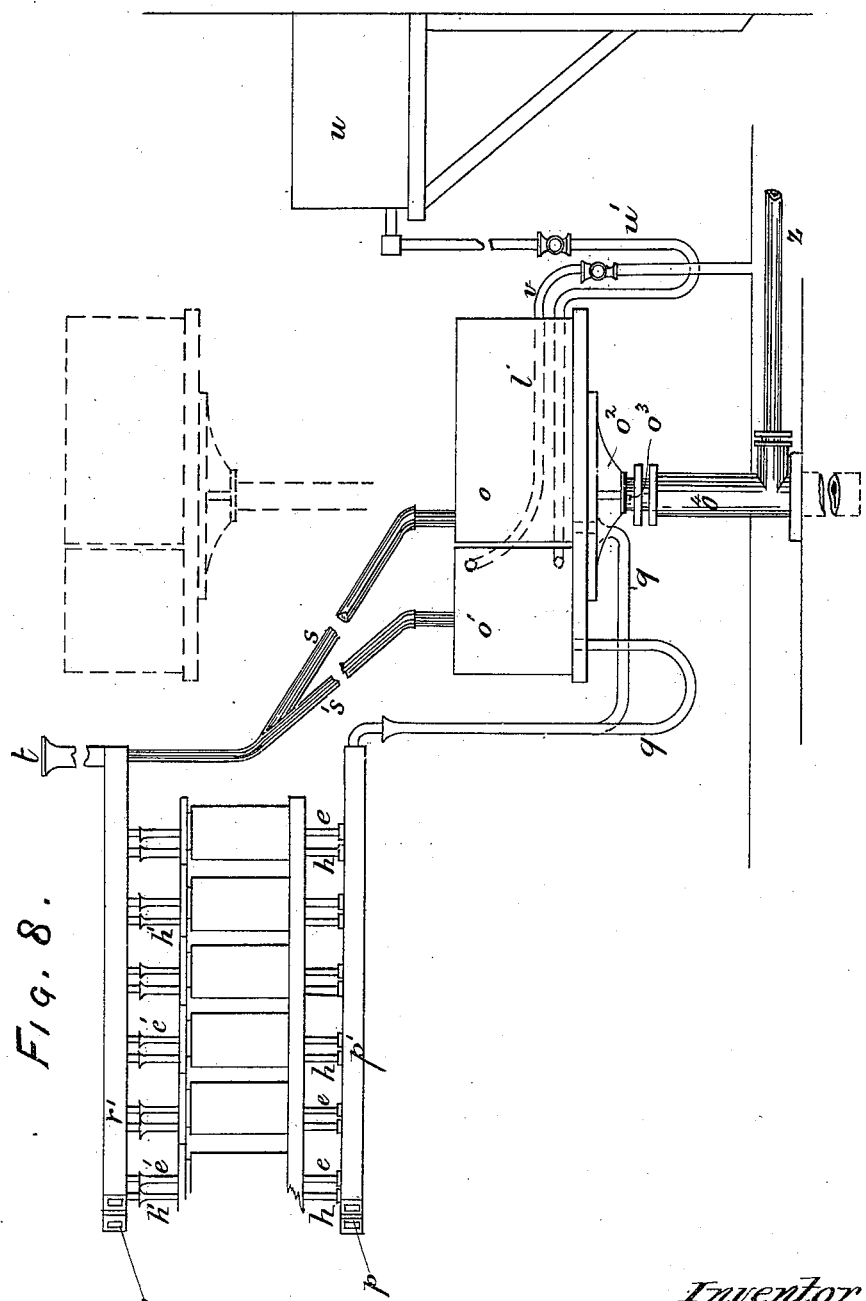

(No Model.) 4 Sheets—Sheet 4.
J. T. ARMSTRONG.
ELECTRIC BATTERY AND MEANS FOR EMPTYING AND RECHARGING IT WITH THE EXCITING FLUID.

No. 340,474. Patented Apr. 20, 1886.

Witnesses,

Inventor.
James T. Armstrong
By James L. Norris.
Atty.

UNITED STATES PATENT OFFICE.

JAMES TARBOTTON ARMSTRONG, OF LONDON, ENGLAND.

ELECTRIC BATTERY AND MEANS FOR EMPTYING AND RECHARGING IT WITH THE EXCITING-FLUID.

SPECIFICATION forming part of Letters Patent No. 340,474, dated April 20, 1886.

Application filed December 9, 1885. Serial No. 185,172. (No model.) Patented in England June 5, 1885, No. 6,878.

*To all whom it may concern:*

Be it known that I, JAMES TARBOTTON ARMSTRONG, a subject of the Queen of Great Britain, residing at 31 Aldermanbury, in the city of London, England, analytical and consulting chemist and electrician, have invented certain new and useful Improvements in Electric Batteries and Means for Emptying and Recharging Them with the Exciting-Fluid, (for which I have obtained a patent in Great Britain, No. 6,878, dated June 5, 1885,) of which the following is a specification.

The objects of my invention are to facilitate the construction of electrical batteries, to reduce the cost of construction, to render such batteries more convenient for commercial and domestic uses, and to render the working more simple and cleanly.

In carrying out my invention I sometimes build up the outer part or trough of each battery, making them of separate parts and unite them together by means of screw-bolts or equivalent appliances; but I prefer to make them in one piece, of any suitable material which is unaffected by the exciting-fluids.

My invention also relates to novel means of supplying, withdrawing, and renewing the exciting-fluids, and withdrawing the fumes or gases arising therefrom.

Figure 9:
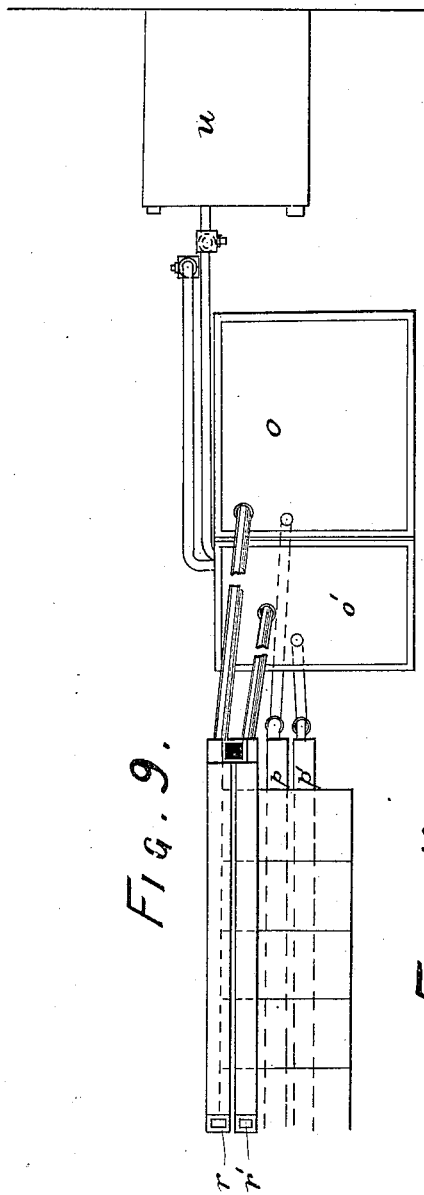
Figure 10:
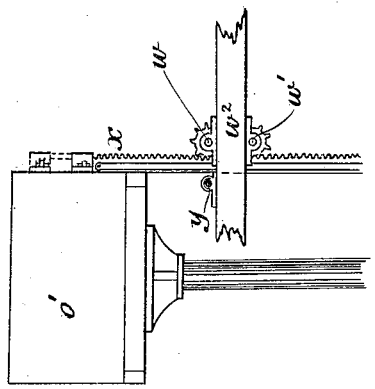

In the accompanying drawings, Figures 1 to 7 illustrate the construction of the batteries, and Figs. 8, 9, and 10 illustrate the method of combining, arranging, and working the same.

Similar letters of reference indicate corresponding parts in the several figures.

Fig. 1 is a perspective view of the central section, $b$, of one of the batteries, with one of the porous plates $c$ removed to show the carbons $b'$ in position. Fig. 2 is a similar view with the porous plate $c$ in position.

The carbons $b'$ are connected at one end with a metallic conductor, as shown at $b^2$ in Fig. 6. These ends of the carbons are fitted into a metallic trough at $b^2$, to which trough a strip of metal, $b^3$, is attached, and this strip $b^3$ is connected with the terminal $k$. In the groove $b^4$ the carbons are insulated and held in position. The flanges $b^5$ thus keep the carbons in position, and also act as distance-pieces to regulate the distance of the porous plates $c$ $c$ from the carbon-rods $b'$.

I do not confine myself to the use of the carbon rods $b'$, as other electrodes may be used in connection with my invention; but I prefer to use those carbon rods which are sold cheaply in consequence of slight defects, rendering them unfit for ordinary arc lights, and which are yet very suitable for use with my invention.

Fig. 7 is a vertical sectional view of the central section, $b$, of the battery. Fig. 5 is a vertical section, and Fig. 6 is a horizontal section, of the battery.

The porous plates $c$ $c$ are secured in fluid-tight joints, and the inclosed space is supplied with fluid by the pipe $e$, the air and fumes being carried away by the pipe $e'$.

The outer case, $a$, may be constructed in one piece, as shown in Figs. 5 and 6; or it may be built up and bolted together by bolts $f$ $f$, as shown in Fig. 3, or by means of flanges. The zinc or other electrodes $d$ $d$ (one of which is shown in section in Fig. 4) are fitted and retained in position as shown in Fig. 5, the lower ends abutting against the flanges $a^2$ $a^2$.

$a'$ $a'$ are webs or provisions to keep the plates $d$ $d$ in position, and the flanges $d'$ $d'$ sustain the same, as shown in Fig. 5.

The spaces $g$ $g$ are supplied with suitable exciting-fluid by the pipe $h$, and the air and fumes are carried away by the pipe $h'$. Sufficient space is provided under the central section to allow the fluid to pass from one of the spaces $g$ $g$ to the other, and additional passages are provided at $i$ $i$ for the same purpose. By these means the pipe $h$ serves to fill and empty all the spaces $g$ $g$, and in like manner the pipe $h'$ conducts the air and fumes away from the same spaces.

$d^2$ is a connecting-strip to connect the plates $d$ $d$.

$k$ is the terminal in connection with the plates $d$ $d$.

$l$ is a cover which covers the whole battery, and which is secured by the rods $m$ $m$ and nuts $n$ $n$. The cover may be secured in any other convenient manner, and rendered tight by means of rubber or other suitable packing material.

By placing the carbon and zinc electrodes in parallel lines, at definitely-fixed distances, and securing them in such position, the internal resistance of the battery is kept very low, which is an important advantage in my improvements.

It will be seen that in cells or batteries constructed as described all connections are situate outside the box $a$, and noxious fumes can only escape through the pipes $e'$ and $h'$.

The apparatus for charging the cells of a battery with exciting-liquid and for withdrawing or renewing the same, as illustrated by Figs. 8, 9, and 10, chiefly comprises a pair of vertical movable tanks, $o\ o'$, (or one tank having two compartments,) one of which contains the exciting-liquid for the positive electrodes and communicates with the respective compartments or receptacles of the battery at the bottom, while the other tank contains the liquid for the negative electrodes and communicates at the bottom with all the compartments of the battery in which the negative electrodes are immersed. The necessary communication may be established by a pair of channels, $p\ p'$, extending along the bottom of the battery, a pair of flexible pipes, $q\ q'$, connecting the said channels with the bottoms of the respective tanks, the two series of upright branch pipes $e\ h$, before mentioned, (a pair of pipes for each battery,) extending from the channels $p\ p'$ up into the corresponding compartments of each battery. (Instead of having the channels $p\ p'$ at the bottom, they may in some cases be placed above the batteries and connected with the cells by india-rubber pipes leading to the bottom of such cells.) A pair of channels or passages, $r\ r'$, connect the air-pipes $e'$ and $h'$ and carry away the air and fumes. A pair of flexible pipes, $s\ s'$, connect the passages or discharge-flues $r\ r'$ with the top of the respective tanks. The channels $p\ p'$ and their connections serve for the passage of liquids, while the upper channels, $r\ r'$, and their connections allow the escape of fumes and air, which may be carried off by a vertical shaft, $t$, to any convenient outlet. The larger tank $o$ is always more or less filled with liquid; but the small tank $o'$ receives its supply from a stationary cistern, $u$, through a flexible pipe, $u'$, provided with an automatic valve, which establishes communication between the tank and the cistern as soon as the tank has discharged a certain portion of its contents. The pipe $v$, leading from the upper part of the tank $o'$, is also provided with an automatic valve adapted to discharge about one-fifth of the quantity or other regulated quantities of liquid contained in the tank $o'$, when necessary.

The two automatic valves may be controlled by the level of the liquid in the tank $o'$, or by the position of the tank.

A method of controlling the automatic valves by the position of the tank is illustrated in Fig. 10. In this figure, $w$ is the spindle of the supply-valve, and $w'$ is the spindle of the discharge-valve. On each spindle or axle is mounted a pinion gearing into a rack, $x$, connected at the top with the tank $o'$. The rack moves up and down with the tank $o'$, and is guided at the back by a runner, $y$, mounted on a pair of parallel beams, $w^2$, which also support the bearings of the valve-spindles $w$ and $w'$. The rack is made variable in length, and the valves are so constructed and arranged that in the lowest position of the tank the tap on the spindle $w$ is open, while the tap on the spindle $w'$ is closed, and that in the highest position of the tank the tap on the spindle $w'$ is open while that on the spindle $w$ is closed; but it is obvious that this arrangement may be varied, and the required motion of the valves or cocks may be produced by other suitable mechanism.

The two movable tanks (or a single tank divided into two compartments) may be raised and lowered by any suitable means for allowing the liquid to run into and out of the battery, but preferably by means of a hydraulic elevator operated from any convenient distance.

The lift may be operated by an attendant standing near the battery by opening a tap adapted to put the space behind the piston in communication either with the pressure-water or with a discharge-pipe; but I prefer to provide means for controlling the lift at a distance from any convenient spot, either by acting electrically on a valve placed near the lift or by operating a valve placed near the attendant.

The details of construction are analogous to those usually employed for hydraulic presses or lifts. They will be easily understood by hydraulic engineers, and do not, therefore, require illustration by drawings.

Fig. 8 shows the two tanks resting on a platform, $o^2$, supported by a vertically-movable piston, $o^3$, in the lift $o^4$, exposed at the bottom to the pressure of water admitted through a pipe, $z$. The travel of the piston is arranged according to the height necessary for filling the battery-cells. The branch pipes $p\ p'\ r\ r'$, leading to and from the batteries, are preferably provided with conical cup-points, as shown, so that the channels $p\ p'\ r\ r'$ may be detached from the battery by simply lifting the upper parts of the branch pipes out of the cups; or the cup-points may be substituted by rubber-tube connections. Under the arrangement described, Fig. 8, the battery-cells may be filled with liquid by simply raising the tanks $o\ o'$ and emptied by lowering the same tanks.

From the foregoing description it will be obvious that in case of one battery in a series getting out of order it can be removed and another placed in the same position in a few minutes.

I am aware of the United States patent to Dun, February 17, 1885, No. 312,340, and lay no claim to anything therein shown or claimed.

Having now particularly described and ascertained the nature of my said invention and in what manner the same is to be performed, I declare that what I claim is—

1. In an electric battery or battery-trough, the combination of the frame $b$, the flanges $b^5$ on the inner face thereof, electrodes, as $b'$, fitting at one end in a metallic trough and at the other in an insulated groove, and porous plates $c$, fitting against flanges $b^5$, substantially as and for the purposes described.

2. In an electric battery, the combination of frame $b$, provided with flanges $b^5$, electrodes $b'$ between said flanges, as specified, porous plates $c$, fitting outside of said flanges, electrodes $d$ outside of said plates, and distance-pieces, as $a^2$, between said electrodes and plates, substantially as described.

3. In an electric battery, the combination, with frame $b$, electrodes $b'$, and porous plates $c$, of the outer trough, $a$, and electrodes $d$, formed with flanges $d'$, said flanges resting on frames $a$ and $b$, and suspending the electrodes, substantially as described.

4. In an electric battery, the combination, with a box, $a$, having electrodes $d$ suspended therein, of the frame $b$, having flanges $b^5$, and provided with side plates, $c$, and electrodes $b'$, inclosed within frame $b$, and having their ends fitting between flanges $b^5$, substantially as described.

5. In an electric battery, the combination of frame $b$, electrodes $b'$ within the same, porous plates $c$, closing the sides of said frame, electrodes $d$, fitting outside of said plates, inlet-pipe $h$ and exit-pipe $h'$ to the space between box $a$ and electrodes $d$, and inlet and exit pipes $e$ $e'$, communicating with the space between frame $b$ and plates $c$, substantially as described.

6. The combination of a battery composed of closed elements with a pair of liquid-reservoirs, $o$ $o'$, adapted to move up and down, and a stationary cistern, $u$, the said reservoirs being connected with the cells of the battery at the top and bottom, as described, and the cistern $o'$, with the stationary cistern $u$, in manner substantially as and for the purposes described, and shown on the drawings.

Dated this 23d day of November, 1885.

JAMES TARBOTTON ARMSTRONG.

Witnesses:
O. G. BEARD,
*Clerk to Geo. Downing, 8 Quality Court, London.*
A. C. DOWNING,
*8 Quality Court, London.*